(12) United States Patent
Roh

(10) Patent No.: US 7,486,359 B2
(45) Date of Patent: Feb. 3, 2009

(54) COLOR FILTER PANEL HAVING MICROLENSES IN TRANSMISSION AREAS AND METHOD OF MANUFACTURING THE SAME, AND TRANSFLECTIVE LIQUID CRYSTAL DISPLAY USING SUCH A COLOR FILTER PANEL

(75) Inventor: Nam-Seok Roh, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/267,699

(22) Filed: Nov. 4, 2005

(65) Prior Publication Data

US 2006/0238673 A1  Oct. 26, 2006

(30) Foreign Application Priority Data

Apr. 25, 2005  (KR) .................. 10-2005-0033994

(51) Int. Cl.
G02F 1/1335  (2006.01)
(52) U.S. Cl. .................. 349/114; 349/95; 349/106
(58) Field of Classification Search .......... 349/95, 349/106–109, 113–114, 150; 430/7; 257/435
See application file for complete search history.

(56) References Cited

U.S. PATENT DOCUMENTS

| | | | | |
|---|---|---|---|---|
| 5,682,215 | A * | 10/1997 | Nishihara et al. | ............. 349/95 |
| 5,844,644 | A * | 12/1998 | Oh et al. | ................. 349/95 |
| 5,929,962 | A * | 7/1999 | Chiu et al. | .............. 349/187 |
| 6,195,140 | B1 * | 2/2001 | Kubo et al. | ............... 349/44 |
| 6,323,920 | B1 | 11/2001 | Kim | |
| 6,483,562 | B1 * | 11/2002 | Fukuyoshi et al. | ......... 349/113 |
| 6,580,480 | B2 * | 6/2003 | Baek et al. | ............. 349/114 |
| 6,975,373 | B2 * | 12/2005 | Il | ....................... 349/106 |
| 6,989,874 | B2 * | 1/2006 | Chae | ...................... 349/95 |
| 7,072,011 | B2 * | 7/2006 | Maeda | ................... 349/114 |
| 2002/0021378 | A1 * | 2/2002 | Murade | ................... 349/43 |
| 2002/0145807 | A1 * | 10/2002 | Nishikawa | .............. 359/619 |
| 2004/0012734 | A1 * | 1/2004 | Yamanaka et al. | ........... 349/95 |
| 2004/0041965 | A1 * | 3/2004 | Liu | ..................... 349/113 |
| 2004/0056999 | A1 * | 3/2004 | Ko et al. | ................. 349/114 |
| 2004/0135945 | A1 * | 7/2004 | Choi et al. | .............. 349/114 |
| 2004/0207785 | A1 * | 10/2004 | Jang et al. | .............. 349/114 |
| 2005/0083459 | A1 * | 4/2005 | Ukawa et al. | ............. 349/114 |

(Continued)

FOREIGN PATENT DOCUMENTS

JP  09-090337  4/1997

(Continued)

*Primary Examiner*—David Nelms
*Assistant Examiner*—John Heyman
(74) *Attorney, Agent, or Firm*—Edward C. Kwok; MacPherson Kwok Chen & Heid LLP

(57) ABSTRACT

A color filter panel for a transflective type LCD with transmission areas and reflection areas includes a substrate, a plurality of color filters formed on the substrate, an overcoat layer formed on the color filters and including lens parts that are individually placed at the transmission areas, and a common electrode formed on the overcoat layer. This construction improves the total reflectance and outdoor visibility by efficiently utilizing exterior light entering the transmission areas for image display without light loss.

23 Claims, 5 Drawing Sheets

U.S. PATENT DOCUMENTS

2006/0114374 A1 * 6/2006 Segawa et al. ................ 349/95

FOREIGN PATENT DOCUMENTS

| JP | 11-052347 | 2/1999 |
| JP | 2002-318382 | 10/2002 |
| JP | 2003-255318 | 9/2003 |
| JP | 2004-118106 | 4/2004 |
| JP | 2004-212676 | 7/2004 |
| KR | 1020020005079 | 1/2002 |
| KR | 1020030069288 | 8/2003 |
| KR | 1020030091752 | 12/2003 |
| KR | 1020040061990 | 7/2004 |
| KR | 1020040100489 | 12/2004 |

* cited by examiner

COLOR FILTER PANEL HAVING MICROLENSES IN TRANSMISSION AREAS AND METHOD OF MANUFACTURING THE SAME, AND TRANSFLECTIVE LIQUID CRYSTAL DISPLAY USING SUCH A COLOR FILTER PANEL

BACKGROUND OF THE INVENTION (a) Field of the Invention

The present invention relates generally to a liquid crystal display (LCD) and, more particularly, to a color filter panel to be used in a transflective LCD with reflective areas and transmission areas, and a method of manufacturing the same. The method also relates to transflective LCD employing the color filter panel.

(b) Description of the Related Art

Generally, an LCD includes a pair of panels individually having electrodes on their inner surfaces, and a dielectric anisotropy liquid crystal layer interposed between the panels. In an LCD, by varying the voltage difference between the field generating electrodes, i.e., by varying the strength of an electric field generated by the electrodes, the transmittance of the light passing through the LCD is changed, and thus obtaining the desired images.

Depending on the way light sources are used to display images, LCDs are divided into three types: transmissive, reflective, and transflective LCDs. In a transmissive LCD, an image is displayed using an internal light source, such as lamps in a backlight unit that is provided behind an LC panel assembly of the device. In a reflective LCD, an image is displayed by reflecting external natural light or external artificial light coming in from the front of the device.

The transmissive LCD is disadvantageous under very bright external conditions, i.e., when light emitted from the lamps in the transmissive LCD becomes significantly lower in brightness than the external light, so that visibility and display characteristics of the device suffer. In addition, the lamps of the backlight require significant power. Meanwhile, the reflective LCD does not fully function as a display device when the external light is insufficient. Due to the above drawbacks of these LCDs, the transflective LCD, which combines transmissive and reflective characteristics, was developed. The transflective LCD is operated in a transmissive mode under medium light conditions, such as in an indoor environment, or under complete darkness. The transflective LCD operates in a reflective mode under very bright conditions, such as in an outdoor environment.

Generally, such a transflective LCD has transmission areas and reflection areas. To display an image using the transmission areas, light emitted from the backlight behind the LC panel assembly passes through the transmission areas, while in the reflection areas, external light from the front of the device is reflected by internal reflective components back to the front of the device.

However, the transmission areas may also be supplied with both external light through the front of the LC panel assembly, and the light from the backlight. Unlike the external light supplied to the reflection areas, the external light supplied to the transmission areas passes through the transmission areas without reflection. That is, such a light does not contribute to image display as a light source. As a result, the total reflectance of the external light source lowers, resulting in the device's low outdoor visibility.

SUMMARY OF THE INVENTION

The present invention provides a color filter panel that enables exterior light entering transmission areas of a transflective LCD to be efficiently used for displaying an image.

The present invention also provides a manufacturing method for the color filter panel.

The present invention also provides a transflective liquid crystal display using the color filter panel.

According to an aspect of the present invention, a color filter panel for a transflective type liquid crystal display includes transmission areas and reflection areas, including a substrate, a plurality of color filters formed on the substrate, an overcoat layer formed on the color filters and including lens parts that are individually placed at the transmission areas, and a common electrode formed on the overcoat layer.

In this structure, each lens part may include a concave surface that is inwardly curved from a top surface of the overcoat layer.

Each lens part may further include a filler layer provided in a space defined by the concave surface. In this case, the filler layer may have a refractive index larger than that of the overcoat layer.

In addition, each lens part may have a diameter substantially equal to a length of the transmission area.

It is preferable that a centermost point of the lens part has a height of 1 µm to 2 µm, while the overcoat layer has a thickness of 1 µm to 2.4 µm.

The overcoat layer may include photosensitive and transparent organic material.

The color filter panel may further include a plurality of light holes each positioned at the reflection areas.

Portions of the color filters corresponding to the transmission areas may be formed thicker than portions of the color filters corresponding to the reflection areas.

According to another aspect of the present invention, there is provided a transflective liquid crystal display with transmission areas and reflection areas, including a first substrate, a plurality of thin film transistors formed on the first substrate, a plurality of pixel electrodes formed on the thin film transistors and provided with a plurality of transparent electrodes and reflection electrodes, a second substrate, an overcoat layer formed on the second substrate and including a plurality of lens parts that are individually formed at the transmission areas, a common electrode formed on the overcoat layer, and a liquid crystal layer interposed between the first and second substrates.

This liquid crystal display may further comprise a plurality of color filters formed between the second substrate and the overcoat layer.

This liquid crystal display may further comprise a passivation layer that is formed between the thin film transistors and the pixel electrodes and is provided with a plurality of apertures formed at the transmission areas.

According to still another aspect of the present invention, there is provided a method of manufacturing a color filter panel including the steps of forming a plurality of color filters on a substrate, forming an overcoat layer on the color filters, forming a plurality of lens parts by patterning the overcoat layer, and forming a common electrode on the overcoat layer.

The overcoat layer may be made of photosensitive and transparent organic material.

The lens part formation step may include the step of forming concave surfaces, in which the overcoat layer is partially exposed to light and the exposed portion is then partially removed to form a concave surface in each lens part.

A step of filling transparent organic material into spaces defined by the concave surfaces of the lens parts may be further included in the steps.

BRIEF DESCRIPTION OF THE DRAWINGS

The above objects and other advantages of the present invention will become more apparent by the description of the preferred embodiments in more detail below, with reference to the accompanying drawings.

DETAILED DESCRIPTION OF THE PREFERRED EMBODIMENTS

Figure 1:
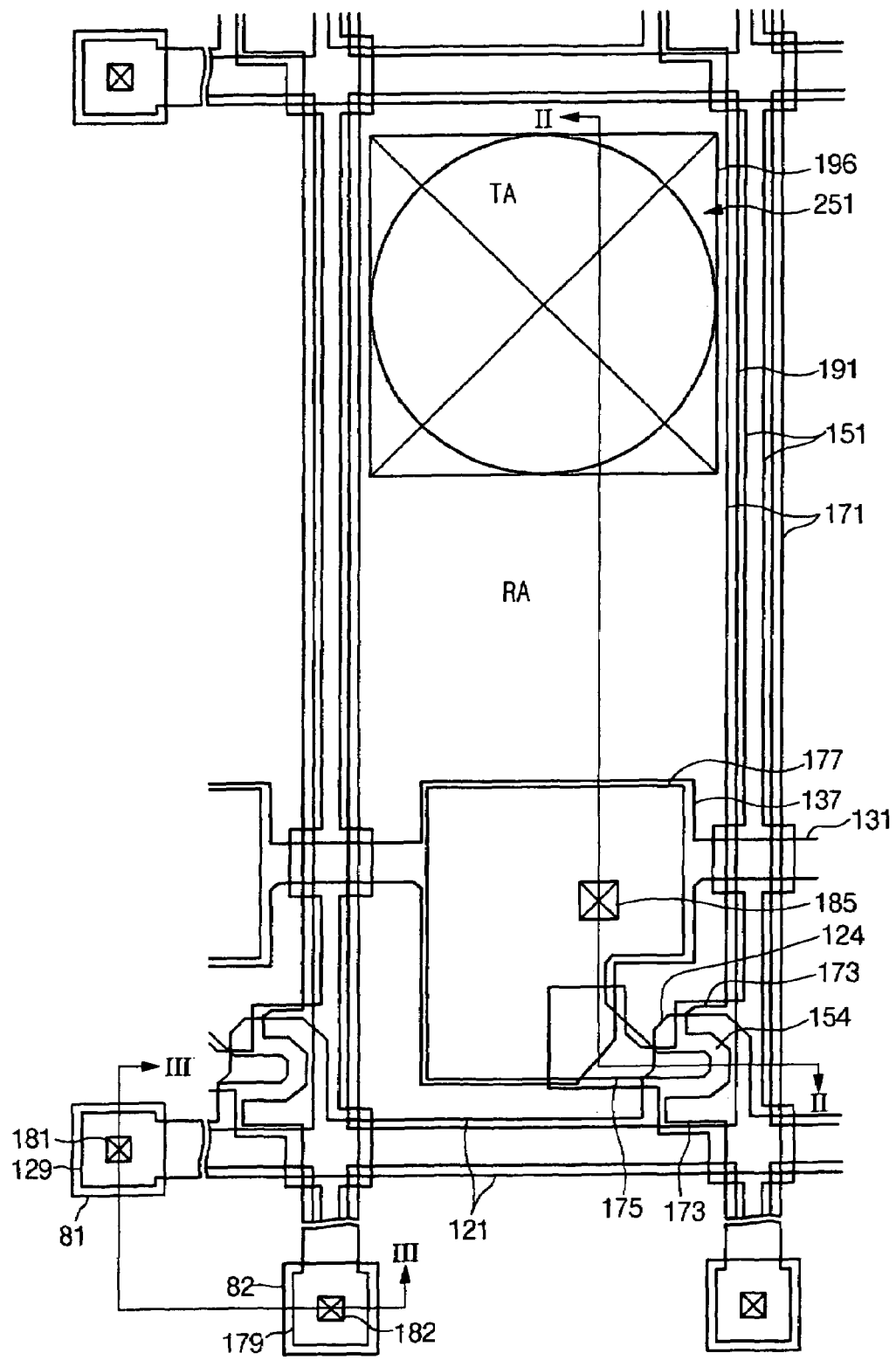
FIG. 1 is a layout view of an LCD according to an embodiment of the present invention.

Preferred embodiments of the present invention are now described more fully hereinafter with reference to the accompanying drawings, in which preferred embodiments of the invention are shown. The present invention may, however, be embodied in different forms and thus the present invention should not be construed as being limited to the embodiments set forth herein. Rather, these embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. When an element such as a layer, film, region, or substrate is referred to as being "on" another element, it can be directly on the other element or intervening elements may also be present.

Hereinafter, an LCD according to an embodiment of the present invention will be described in detail with reference to FIG. 1 through FIG. 3.

Figure 2:
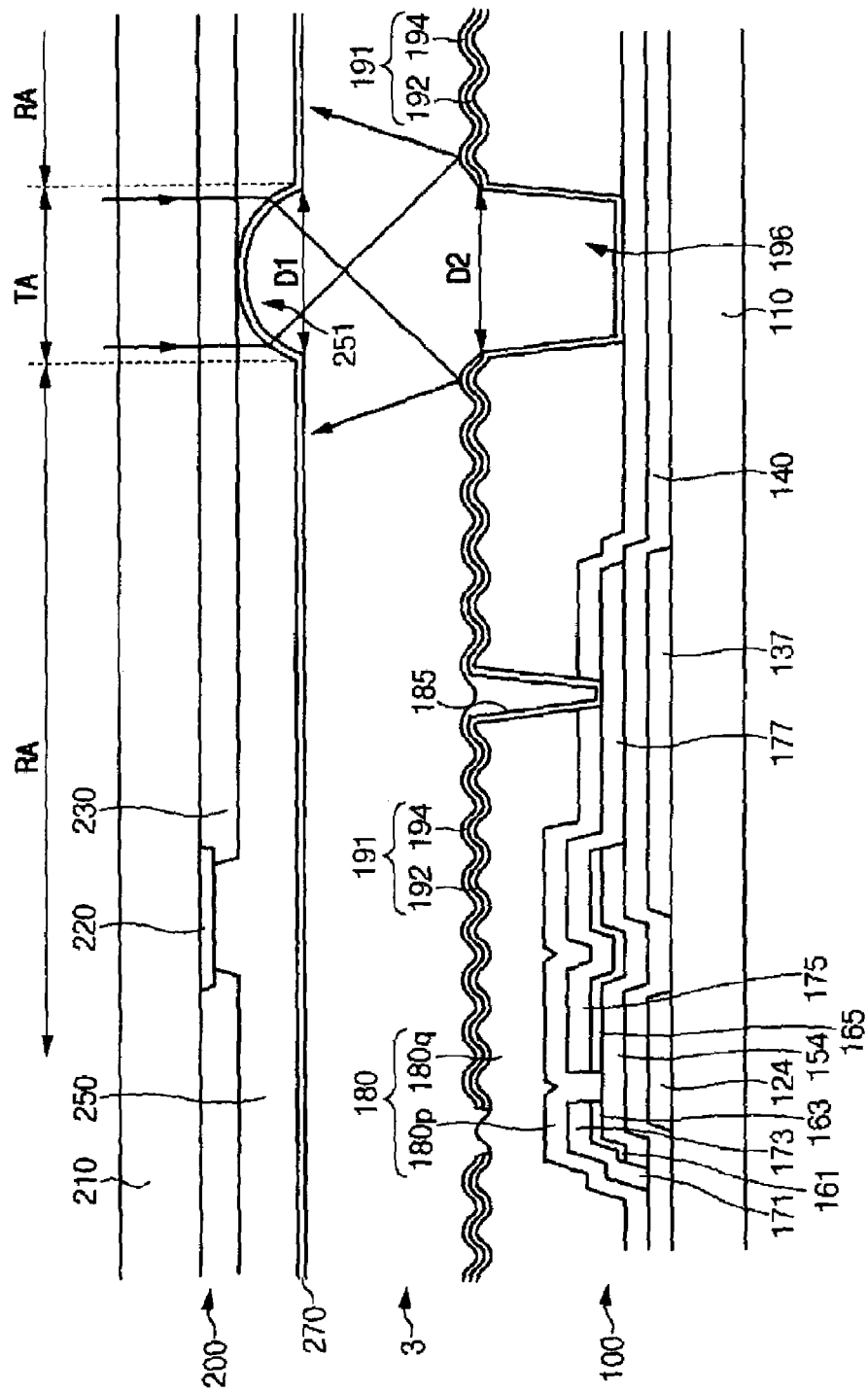
FIG. 2 is a schematic cross-sectional view cut along II-II' of FIG. 1.
Figure 3:
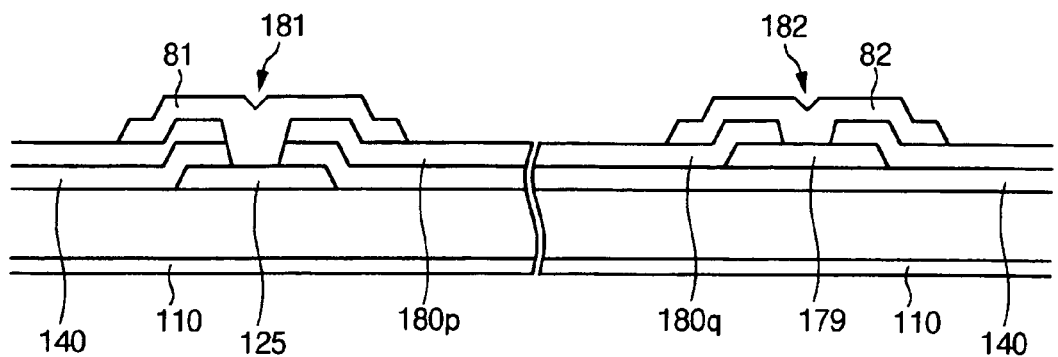
FIG. 3 is a schematic cross-sectional view cut along III-III' of FIG. 1.

FIG. 1 is a layout view of an LCD according to an embodiment of the present invention, and FIG. 2 and FIG. 3 are cross-sectional views cut along II-II' and III-III' of FIG. 1, respectively.

Referring to FIG. 1 to FIG. 3, the LCD of this embodiment includes a TFT array panel 100 and a color filter panel 200 facing each other, and a liquid crystal layer interposed therebetween.

The TFT array panel 100 is configured as follows.

A plurality of gate lines 121 and a plurality of storage electrode lines 131 are formed on an insulating substrate 110 made of transparent glass or plastic.

The gate lines 121 for transmitting gate signals extend substantially in a horizontal direction. Each gate line 121 includes a plurality of gate electrodes 124 protruding upward and an end portion 129 having a relatively large dimension to for connecting to a different layer or an external device. A gate driver (not shown) for generating the gate signals may be mounted on a flexible printed circuit (not shown) attached to the substrate 110, or directly on the substrate 110. Otherwise, the gate driver may be integrated into the substrate 110. In this case, the gate lines 121 are directly connected to the gate driver.

The storage electrode lines 131 which receive a predetermined voltage extend substantially parallel to the gate lines 121. Each storage electrode line 131 is placed between two adjacent gate lines; particularly, in FIG. 1, the storage electrode line 131 is placed closer to the lower-positioned gate line of the two. Each storage electrode line 131 includes a plurality of expansions 137 protruding upward and downward. The form and arrangement of the storage electrode lines 131 disclosed herein are merely for illustrative purpose, the storage electrode lines 131 may have other forms and arrangements.

The gate lines 121 and the storage electrode lines 131 are preferably made of an aluminum (Al) containing metal such as Al or an Al alloy, a silver (Ag) containing metal such as Ag or a Ag alloy, a gold (Au) containing metal such as Au or a Au alloy, a copper (Cu) containing metal such as Cu or a Cu alloy, a molybdenum (Mo) containing metal such as Mo or a Mo alloy, chromium (Cr), titanium (Ti), or tantalum (Ta). The gate lines 121 and the storage electrode lines 131 may be configured as a multi-layered structure, in which at least two conductive layers (not shown) having different physical properties may be included. In such a structure, one of the two conductive layers is made of low a resistivity metal, such as an Al containing metal, an Ag containing metal, or a Cu containing metal, in order to reduce delay of the signals or voltage drop in the gate lines 121 and the storage electrode lines 131. The other conductive layer is made of a material having prominent physical, chemical, and electrical contact properties with other materials such as indium tin oxide (ITO), or indium zinc oxide (IZO). For example, Mo containing metal, Cr, Ta, Ti, may be used to form the same layer. Desirable examples of the combination of the two layers are a lower Cr layer and an upper Al (or Al alloy) layer, and a lower Al (or Al alloy) layer and an upper Mo (or Mo alloy) layer. Besides the materials discussed above, various metals and conductors can be used to form the gate lines 121 and the storage electrode lines 131.

All lateral sides of the gate lines 121 and the storage electrode lines 131 preferably slope between about 30° and about 80° relative to the surface of the substrate 110.

A gate insulating layer 140 made of nitride silicon (SiNx) or oxide silicon ($SiO_2$), is formed on the gate lines 121 and the storage electrode lines 131.

A plurality of linear semiconductors 151 made of hydrogenated amorphous silicon (abbreviated as "a-Si") or polysilicon are formed on the gate insulating layer 140. Each linear semiconductor 151 extends substantially in a vertical direction, including a plurality of projections 154 that extend along the respective gate electrodes 124. The linear semiconductors 151 are enlarged in the vicinities of the gate lines 121 and the storage electrode lines 131.

A plurality of linear ohmic contacts 161 and island-shaped ohmic contacts 165 are formed on the linear semiconductors 151. The ohmic contacts 161 and 165 may be made of N+ hydrogenated amorphous silicon that is highly doped with N-type impurities such as phosphorus (P), or silicide. The linear ohmic contacts 161 include a plurality of projections 163. A set of a projection 163 and an island-shaped ohmic contact 165 are placed on the projection 154 of the semiconductor 151.

All lateral sides of the semiconductors 151 and 154 and the ohmic contacts 161, 163, and 165 slope between about 30° and 80° relative to the surface of the substrate 110.

A plurality of data lines 171 and a plurality of drain electrodes 175 are formed on the ohmic contacts 161, 163, and 165 and the gate insulating layer 140.

The data lines 171 for transmitting data signals extend substantially in a vertical direction to cross the gate lines 121 and the storage electrode lines 131. Each data line 171 includes a plurality of source electrodes 173 extending toward the respective gate electrodes 124, and an end portion 179 having a relatively large dimension to connect to a different layer or an external device. A data driver (not shown) for generating the data signals may be mounted on a flexible printed circuit (not shown) attached to the substrate 110, or directly on the substrate 110. Otherwise, the data driver may be integrated into the substrate 110. In this case, the data lines 171 are directly connected to the gate driver.

The drain electrodes 175 separated from the data lines 171 are placed opposite to the source electrodes 173, centering on the gate electrodes 124. Each drain electrode 175 includes an expansion 177 having a relatively large dimension and a-bar-shaped end portion. The expansions 177 of the drain electrodes 175 overlap the expansions 137 of the storage electrode lines 131, and the bar-shaped end portions are partially surrounded with the source electrodes 173 curved in the shape of the character "J".

A gate electrode 124, a source electrode 173, a drain electrode 175, and a projection 154 of the semiconductor 151 form a thin film transistor (TFT). A TFT channel is formed in the projection 154 provided between the source electrode 173 and the drain electrode 175.

The data lines 171 and the drain electrodes 175 are preferably made of a refractory metal such as Mo, Cr, Ta, or Ti, or any of their alloys, and may be configured as multi-layered structures including a refractory metal layer (not shown) and a low resistivity conductive layer (not shown). A desirable example of the multi-layered structure is a lower layer made of Cr, Mo, or a Mo alloy, and an upper layer made of Al or an Al alloy. Another example is a lower layer made of Mo or a Mo alloy, an intermediate layer made of Al or an Al alloy, and an upper layer made of Mo or a Mo alloy. Besides the above-listed materials, various metals and conductors can be used for the to form the data lines 171 and the drain electrodes 175.

All lateral sides of the data lines 171 and the drain electrodes 175 preferably slope between about 30° and about 80° relative to the surface of the substrate 110.

The ohmic contacts 161, 163, and 165 exist only between the underlying semiconductors 151 and the overlying data lines 171 and between the overlying drain electrodes 175 and the underlying semiconductors 151, in order to reduce contact resistance. Most of the linear semiconductors 151 are formed more narrowly than the data lines 171, but partial portions of the linear semiconductors 151 are enlarged in the vicinities where they may cross the gate lines 121, as previously mentioned, in order to prevent the data lines 171 from being shorted. The linear semiconductors 151 are partially exposed at places where the data lines 171 and the drain electrodes 175 do not cover them, as well as between the source electrodes 173 and the drain electrodes 175.

A passivation layer 180 is formed on the data lines 171, the drain electrodes 175, and the exposed portions of the semiconductors 151. The passivation layer 140 is configured as a double-layered structure including a lower layer 180p made of an inorganic insulator, such as SiNx or SiO$_2$, and an upper layer 180q made of an organic insulator. A desirable organic insulator for the upper passivation layer 180q has a low dielectric constant of below 4.0 or photosensitivity. The upper passivation layer 180q is provided with apertures where the lower passivation layer 180p is partially exposed, and the top surface of the upper passivation layer 180q is uneven. The passivation layer 180 may be configured as a single layer made of an inorganic insulator or an organic insulator.

The passivation layer 180 is provided with a plurality of contact holes 182 and 185, through which the end portions 179 of the data lines 171 and the drain electrodes 175 are exposed, respectively. A plurality of contact holes 181 are formed in the passivation layer 180 and the gate insulating layer 140, and the end portions 129 of the gate lines 121 are exposed.

A plurality of pixel electrodes 191 and a plurality of contact assistants 81 and 82 are formed on the passivation layer 180.

Each pixel electrode 191 includes a transparent electrode 192 and a reflective electrode 194 overlying the transparent electrode 192. The transparent electrodes 192 are made of a transparent conductor such as ITO or IZO, and the reflective electrodes 194 are made of an opaque reflectivity conductor such as Al, Cr, Ag, or an alloy of these elements. However, the reflective electrodes 194 may be configured as a double-layered structure. In such a double-layered structure, upper layers may be made of a low resistivity metal such as Al, Ag, or an Ag alloy, and lower layers may be made of a material having prominent contact properties with ITO and IZO, such as a Mo containing metal, Cr, Ta, or Ti.

Each pixel electrode 191 has a ripple-shaped profile caused by the uneven top surface of the passivation layer 180. Each reflective electrode 194 has a transmission window 196 for exposing the transparent electrode 192. The transmission window 196 aligns with the aperture of the upper passivation layer 180q.

The pixel electrodes 191 are physically and electrically connected to the drain electrodes 175 through the contact holes 185 in order to receive data voltages from the drain electrodes 175. The pixel electrodes 191 supplied with the data voltages generate electric fields in cooperation with a common electrode 270 of the color filter panel 200, determining the orientations of liquid crystal molecules in the liquid crystal layer 3 interposed between the two electrodes 191 and 270. According to the orientations of the liquid crystal molecules, the polarization of light passing through the liquid crystal layer 3 is varied. Each set of the pixel electrode 191 and the common electrode 270 forms a liquid crystal capacitor capable of storing charge to maintain the applied voltage after the TFT is turned off.

In a transflective LCD, there are transmission areas TA defined by the transparent electrodes 192 and reflection areas RA defined by the reflective electrodes 194. More specifically, a transmission area TA is a section disposed on and under the transmission window 196 in the TFT array panel 100, the color filter panel 200, and the liquid crystal layer 3, while a reflection area RA is a section disposed on and under the reflective electrode 194. In the transmission areas TA, light emitted from the rear of the LCD passes through the TFT panel 100 and the liquid crystal layer 3 and then exits the color filter panel 200, thus contributing light to the display. In the reflection areas RA, exterior light supplied through the front of the LCD passes through the liquid crystal layer 3 and is reflected by the reflective electrodes 194 of the TFT panel 100. The reflected light passes through the liquid crystal layer 3 again and exits the color filter panel 200, thus contributing light to the display.

The apertures of the upper passivation layer 180q compensate a light path difference between the transmission areas TA and the reflection areas RA. The uneven top surface of the reflective electrodes 194 prevents mirror reflection. Accordingly, images due to the mirror reflection are prevented.

The pixel electrodes 191 overlap the storage electrodes 131 and the expansions 137. To enhance the charge storage ability of the liquid crystal capacitors, storage capacitors are further provided. The storage capacitors are implemented by overlapping the pixel electrodes 191 and the drain electrodes 175 electrically connected thereto with the storage electrode lines 131.

The contact assistants 81 and 82 are connected to the end portions 129 of the gate lines 121 and the end portions 179 of the data lines 171 through the contact holes 181 and 182, respectively. The contact assistants 81 and 82 supplement adhesion between the exposed end portions 129 and 179 and exterior devices, and protect them.

The color filter panel 200, facing the TFT array panel 100, is configured as follows.

A plurality of light blocking elements 220 called "black matrices" are provided on an insulating substrate 210 made of transparent glass or plastic. The light blocking elements 220 prevent light from leaking out through barriers between the pixel electrodes 191 for a vivid color display, while blocking light incident toward the projections 154 of the semiconductors 151. The light blocking elements 220 define aperture regions facing the pixel electrodes 191.

Each light blocking element 220 may be configured as a single layer of Cr or a double layer of Cr and chromium oxide. Alternatively, the blocking elements 220 may be configured as an organic layer with black pigments.

A plurality of color filters 230 are formed on the substrate 210 and the light blocking elements 220. Most color filters 230 are placed within the aperture regions delimited by the light blocking elements 220. Each color filter 230 is placed between two adjacent data lines 171 in a vertical direction, exhibiting one of the red, green, and blue colors. There may be a color filter exhibiting a white color. The color filters 230 are connected to one another as stripes.

An overcoat layer 250 is formed on the light blocking elements 220 and the color filters 230. The overcoat layer 250 includes lens parts 251 placed at the transmission areas TA. Each lens part 251 has a concave surface 252 inward curving from the top surface of the overcoat layer 250. The lens parts 251 refract light incident to the transmissive area TA through the front of the color filter panel 200, toward the reflection area RA, so that the refracted light is used for the display. Such refraction is caused by a difference in refractive indices of the different layers, such as the overcoat layer 250 and the liquid crystal layer 3. For example, as indicated by arrows in FIG. 2, external light is incident perpendicularly to the panel 200 in the transmission area TA, and is refraced in the transmission area TA at the concave surface 252 of the lens part 251. The refracted light enters the reflection area RA and then is reflected by the reflective electrode 194. The reflected light proceeds toward the front of the color filter panel 200, thus contributing to the display. In this way, reflectance of the exterior light, which enters the transmission areas TA through the front of the panel 200, is enhanced.

The length D1 of the lens part 251 is practically equal to the length D2 of the transmission area TA. Such a construction ensures sufficient reflectance by refracting almost all of the exterior light that enters the transmission area TA through the front of the panel 200, toward the reflection area RA.

The lens part 251 has a height of about 1 µm to 2 µm at the centermost point. The thickness of the overcoat layer 250 is preferably equal to or larger than the centermost height of the lens part 251 by 20%. That is, a preferable thickness is between about 1 µm and about 2.4 µm.

A common electrode 270, made of a transparent conductive material such as ITO or IZO, is formed on the overcoat layer 250.

Figure 4:
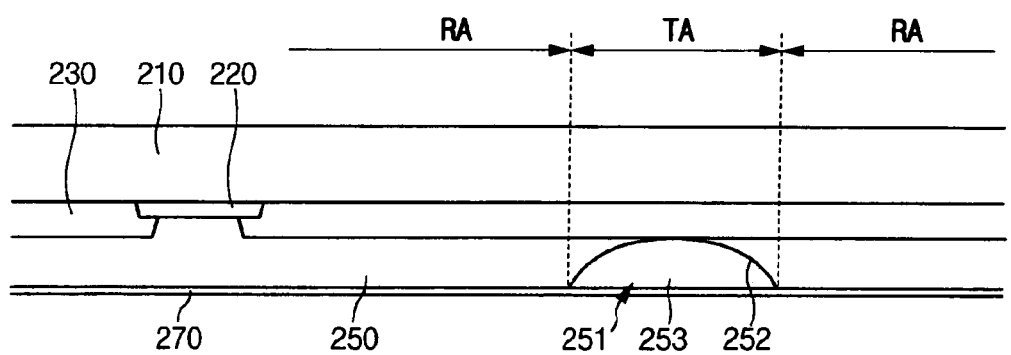
FIG. 4 to FIG. 6 are schematic cross-sectional views of three color filter panels according to three different embodiments of the present invention.
Figure 5:
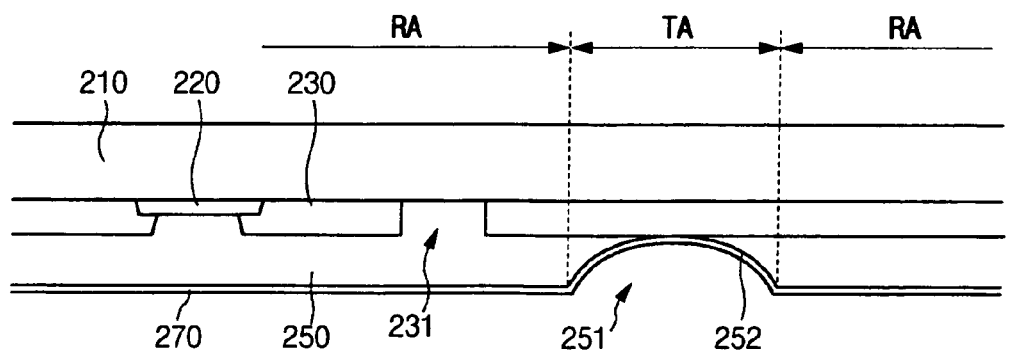
Figure 6:
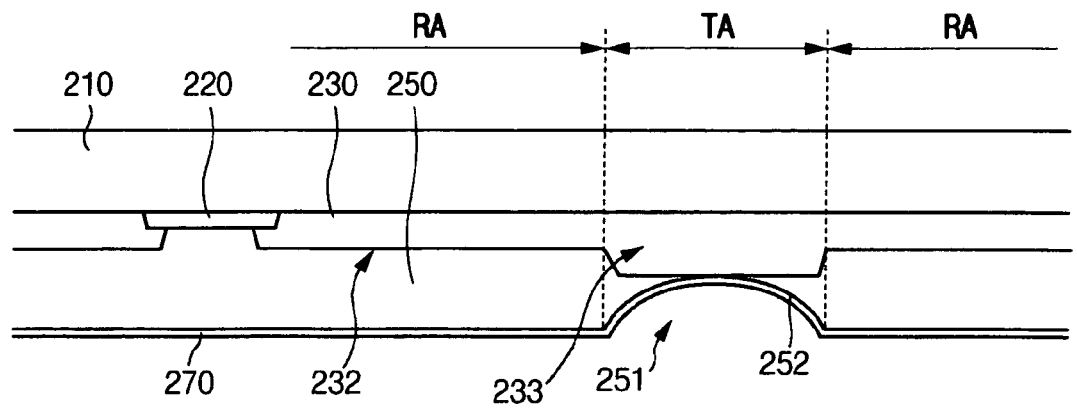

FIG. 4 to FIG. 6 are cross-sectional views of three color filter panels according to three different embodiments of the present invention.

In all the drawings, a plurality of light blocking elements 220 called "black matrices" are provided on an insulating substrate 210 made of a transparent glass or a plastic. A plurality of color filters 230 are formed on the substrate 210 and the light blocking elements 220. An overcoat layer 250 is formed on the light blocking elements 220 and the color filters 230. The overcoat layer 250 includes lens parts 251 placed at the transmission areas TA. Each lens part 251 has a concave surface 252 inward curving from the top surface of the overcoat layer 250.

A color filter panel 200 of FIG. 4 further includes fillers 253 provided in spaces defined by the concave surfaces 252 of the lens parts 251 The filler 253 preferably has a refractive index larger than that of the overcoat layer 250. Top surfaces of the fillers 253 and the overcoat layer 250 form a flat surface. Accordingly, the inner surface of the color filter panel 200 are even.

A color filter panel 200 of FIG. 5 further includes light holes 231 in the color filters 230. In a typical transflective LCD, light passes through the color filters 230 only once in the transmission areas TA, while light passes through twice in the reflection areas RA. Accordingly, a difference of color tone between the transmission areas TA and the reflection areas RA results, which may be compensated by the light holes 231. Each light hole 231, which is formed at the reflection area RA, is rectangular or circular.

In the color filter panel 200 of FIG. 6, the thickness of the color filter 230 is different, depending on its location. In detail, a first portion 233 of the color filter 230, which is placed at the transmission area TA, is formed thicker than a second potion 232, which is placed at the reflection area RA. The color filters 230 formed in this way reduce the difference of color tone between the transmission areas TA and the reflection areas RA.

Hereinafter, a manufacturing method of the color filter panel 200 shown in FIG. 4 is described with reference to FIG. 7A through FIG. 7E.

FIG. 7A through FIG. 7E are schematic cross-sectional views showing process steps to manufacture the color filter of FIG. 4.

Figure 7A:
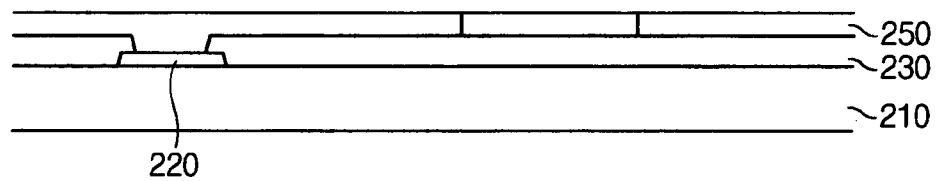
FIG. 7A through FIG. 7E are schematic cross-sectional views showing process steps to manufacture the color filter of FIG. 4.

As shown in FIG. 7A, light blocking elements 220 and color filters are successively formed on a insulating substrate 210, and then an overcoat layer 250 made of a photo-sensitive organic insulator is coated thereon.

Figure 7B:
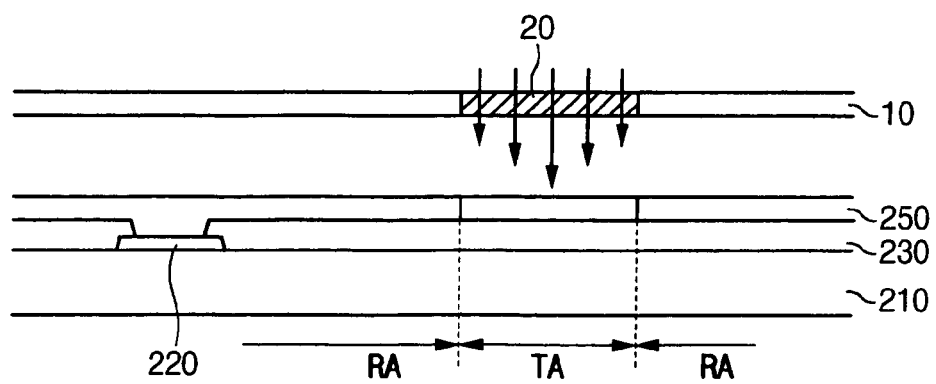

Next, a portion 20 of the overcoat layer 250, which corresponds to a transmission area TA, is exposed to light through a transparent or a translucent mask 10, as shown in FIG. 7B. Here, transmittance of the light passing through the mask 10 is highest at the center of the portion 20 and decreases towards the center. The mask for this step can be selected from various kinds of mask. For example, a mask having slits differently spaced apart from one another, depending on the location, a mask having partially different transmittance, and a double mask, to which energy for exposure is differently transmitted.

Figure 7C:
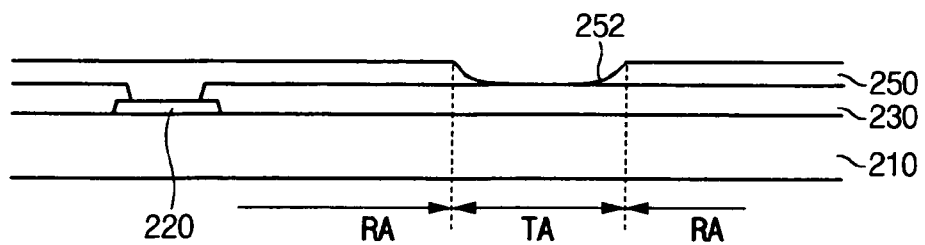

Next, as shown in FIG. 7C, the exposed portion of the overcoat layer 250 is developed, and then is partially removed. As a result, a concave surface 252 of the overcoat layer 250 is formed at the transmission area TA. As previously mentioned, this concave surface 252 serves as a lens that refracts light entering the transmission area TA.

Figure 7D:
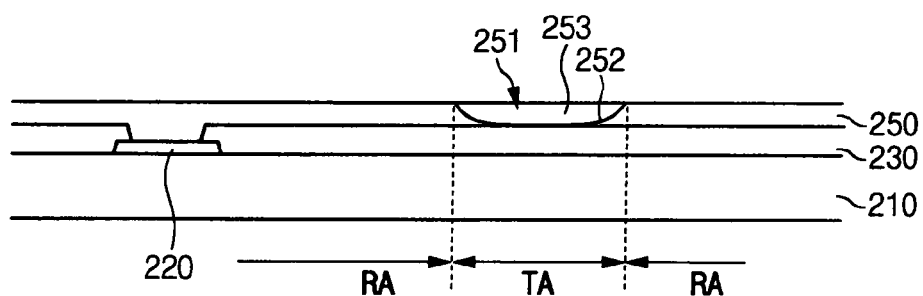

Next, as shown in FIG. 7D, a filler 253, made of a transparent organic material and having a refractive index larger than that of the overcoat layer 250, is filled in a space defined by the concave surface 252.

Figure 7E:
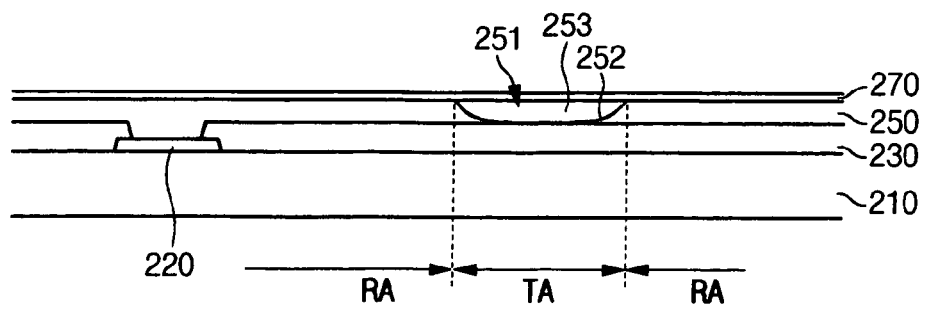

Next, as shown in FIG. 7E, a common electrode 270 is formed on the overcoat layer 250.

Meanwhile, in the color filter panel 200 shown in FIG. 2, the common electrode 270 is formed directly on the overcoat layer 250 with the concave surfaces 251, without providing the filler 252.

According to the present invention, as mentioned in the above, the total reflectance of the device and its outdoor visibility are improved since exterior light entering the transmission areas TA is used for image display without light loss.

The present invention is not limited to the particular examples described above, but covers all aspects of the invention as fairly set out in the attached claims. Various modifications, equivalent processes, as well as numerous structures to which the present invention may be applicable are possible upon review of the instant specification.

What is claimed is:

1. A color filter panel for a transflective liquid crystal display with transmission areas and reflection areas, comprising:
   a substrate;
   a plurality of color filters formed on the substrate;
   an overcoat layer formed on the color filters having a first surface and a second surface, the second surface being located farther away from the substrate than the first surface, including lens parts, and each lens part including a concave surface that is inwardly curved from the second surface; and
   a common electrode formed on the overcoat layer,
   wherein a distance between the first and second surfaces varies and reaches its minimum value within the transmission areas.

2. The color filter panel of claim 1, wherein each of the lens parts further includes a filler layer provided in a space defined by the concave surface.

3. The color filter panel of claim 2, wherein the filler layer has a refractive index larger than that of the overcoat layer.

4. The color filter panel of claim 1, wherein each of the lens parts has a diameter substantially equal to the length of the transmission area.

5. The color filter panel of claim 1, wherein a centermost point of each lens part has a height of 1 μm to 2 μm.

6. The color filter panel of claim 5, wherein the overcoat layer has a thickness of 1 μm to 2.4 μm.

7. The color filter panel of claim 1, wherein the overcoat layer includes photosensitive and transparent organic material.

8. The color filter panel of any one among claim 1 through claim 7, further comprising light holes positioned at the reflection areas.

9. The color filter panel of any one among claim 1 through claim 7, wherein portions of the color filters corresponding to the transmission areas are formed thicker than portions of the color filters corresponding to the reflection areas.

10. A transflective liquid crystal display with transmission areas and reflection areas, comprising:
    a first substrate;
    a plurality of thin film transistors formed on the first substrate;
    a plurality of pixel electrodes formed on the thin film transistors and provided with a plurality of transparent electrodes and reflection electrodes;
    a second substrate;
    an overcoat layer formed on the second substrate having a first surface and a second surface, the second surface being provided further away from the second substrate than the first surface and including a plurality of lens parts that are individually formed at the transmission areas;
    a common electrode formed on the overcoat layer; and
    a liquid crystal layer interposed between the first and second substrates.

11. The transflective liquid crystal display of claim 10, further comprising a plurality of color filters formed between the second substrate and the overcoat layer.

12. The transflective liquid crystal display of claim 11, further comprising a passivation layer that is formed between the thin film transistors and the pixel electrodes and is provided with a plurality of apertures formed at the transmission areas.

13. A method of manufacturing a color filter panel for a transflective liquid crystal display having transmission areas and reflection areas, comprising the steps of:
    (a) forming a plurality of color filters on a substrate;
    (b) forming an overcoat layer on the color filters, the overcoat layer having a first surface and a second surface, the second surface being located farther away from the substrate than the first surface;
    (c) forming a plurality of lens parts by patterning the second surface of the overcoat layer; and
    (d) forming a common electrode adjacent the overcoat layer,
    wherein a distance between the first and second surfaces varies and reaches its minimum value within the transmission areas.

14. The method of claim 13, wherein the overcoat layer is made of photosensitive and transparent organic material.

15. The method of claim 14, wherein the step (c) includes a step of forming concave surfaces, in which the overcoat layer is partially exposed to light, and the exposed portion is then partially removed to form a concave surface in each lens part.

16. The method of claim 15, further comprising filling transparent organic material into spaces defined by the concave surfaces of the lens parts.

17. The method of claim 16, wherein the transparent organic material has a refractive index larger than that of the overcoat layer.

18. The method of claim 15, wherein each of the lens parts has a diameter substantially equal to the length of the transmission area.

19. The method of claim 13, wherein a centermost point of at least one of the lens parts has a height of 1 μm to 2.4 μm.

20. The method of claim 19, wherein the overcoat layer has a thickness of 1 μm to 2.4 μm.

21. The color filter panel of claim 1, wherein the thickness of the overcoat layer is greater than the thickness at the center of each lens part by 20%.

22. The transflexive liquid crystal display of claim 10, wherein the thickness of the overcoat layer is greater than the thickness at the center of each lens part by 20%.

23. The method of claim 13, wherein the thickness of the overcoat layer is greater than the thickness at the center of each lens part by 20%.

* * * * *